United States Patent
Gangakhedkar et al.

(10) Patent No.: US 12,120,404 B2
(45) Date of Patent: Oct. 15, 2024

(54) SYSTEM AND METHOD FOR DELIVERING MEDIA CONTENT TO USERS

(71) Applicant: Novi Digital Entertainment Private Limited, Mumbai (IN)

(72) Inventors: Kunal Jayant Gangakhedkar, Mumbai (IN); Nikhil Soman, Mumbai (IN); Akash Saxena, Mumbai (IN); Agrawal Ashutosh, Mumbai (IN)

(73) Assignee: NOVI DIGITAL ENTERTAINMENT PRIVATE LIMITED, Mumbai (IN)

( * ) Notice: Subject to any disclaimer, the term of this patent is extended or adjusted under 35 U.S.C. 154(b) by 0 days.

(21) Appl. No.: 18/041,535

(22) PCT Filed: Aug. 13, 2021

(86) PCT No.: PCT/IN2021/050781
§ 371 (c)(1),
(2) Date: Feb. 13, 2023

(87) PCT Pub. No.: WO2022/034619
PCT Pub. Date: Feb. 17, 2022

(65) Prior Publication Data
US 2023/0308733 A1    Sep. 28, 2023

(30) Foreign Application Priority Data
Aug. 14, 2020  (IN) .............................. 202021035012

(51) Int. Cl.
*H04N 21/858* (2011.01)
*H04L 43/08* (2022.01)
(Continued)

(52) U.S. Cl.
CPC ......... *H04N 21/8586* (2013.01); *H04L 43/08* (2013.01); *H04L 43/10* (2013.01);
(Continued)

(58) Field of Classification Search
CPC .......... H04N 21/8586; H04N 21/2393; H04N 21/25816; H04N 21/25841; H04L 43/08; H04L 43/10; H04L 45/302
See application file for complete search history.

(56) References Cited

U.S. PATENT DOCUMENTS

| 5,646,676 A | 7/1997 | Dewkett et al. |
| 5,684,963 A | 11/1997 | Clement |

(Continued)

FOREIGN PATENT DOCUMENTS

| CN | 103546477 A | 1/2014 |
| CN | 103368940 B | 4/2017 |

(Continued)

OTHER PUBLICATIONS

European Office Action, dated Jun. 13, 2023, Application No. 22150150.5, 2 pages.

(Continued)

*Primary Examiner* — Sumaiya A Chowdhury
(74) *Attorney, Agent, or Firm* — Kwan & Olynick LLP

(57) ABSTRACT

A method (900) and system (150) for delivering media content to users is disclosed. A request for a playback URL in relation to a content title is received from an electronic device (104) associated with a user (102). At least a network Autonomous System Number (ASN), an IP address and a content ID are extracted from the request. A location of the user (102) is determined based on the network ASN and the IP address. Relevant Content Delivery Networks (CDNs) are identified based on the location and the content ID. An optimal CDN is selected based on at least one performance statistic and at least one predefined routing policy. The playback URL is provided to the electronic device (104) in response to the request for the playback URL. The playback (Continued)

URL is configured to facilitate display of content associated with the content title on the electronic device (104).

20 Claims, 9 Drawing Sheets

(51) Int. Cl.
    *H04L 43/10*     (2022.01)
    *H04L 45/302*     (2022.01)
    *H04N 21/239*     (2011.01)
    *H04N 21/258*     (2011.01)

(52) U.S. Cl.
    CPC ....... *H04L 45/302* (2013.01); *H04N 21/2393* (2013.01); *H04N 21/25816* (2013.01); *H04N 21/25841* (2013.01)

(56) References Cited

U.S. PATENT DOCUMENTS

| | | | |
|---|---|---|---|
| 6,205,477 B1 | 3/2001 | Johnson et al. | |
| 6,591,383 B1 | 7/2003 | Michel et al. | |
| 7,742,485 B2 | 6/2010 | Zhang | |
| 7,895,445 B1 | 2/2011 | Albanese et al. | |
| 8,117,306 B1 | 2/2012 | Baumback et al. | |
| 8,169,916 B1 | 5/2012 | Pai et al. | |
| 8,276,180 B1 | 9/2012 | Slavenburg et al. | |
| 8,370,208 B1 | 2/2013 | Gupta et al. | |
| 8,438,393 B2 | 5/2013 | Zhang | |
| 8,707,375 B2 | 4/2014 | Hainline | |
| 8,843,972 B2 | 9/2014 | Calisa et al. | |
| 9,078,020 B2 | 7/2015 | Buehl et al. | |
| 9,204,103 B1 | 12/2015 | Zhang et al. | |
| 9,712,850 B2 | 7/2017 | Buehl et al. | |
| 9,986,049 B2* | 5/2018 | Zhao ................... H04M 7/0084 | |
| 10,194,210 B2 | 1/2019 | Coudurier et al. | |
| 11,082,741 B2 | 8/2021 | Xie et al. | |
| 11,496,786 B2 | 11/2022 | She et al. | |
| 11,889,140 B2 | 1/2024 | She et al. | |
| 2002/0059573 A1 | 5/2002 | Nishio et al. | |
| 2004/0226045 A1 | 11/2004 | Nadarajah | |
| 2005/0033858 A1 | 2/2005 | Swildens et al. | |
| 2006/0168632 A1 | 7/2006 | Honda et al. | |
| 2008/0215718 A1 | 9/2008 | Stolorz et al. | |
| 2008/0306999 A1 | 12/2008 | Finger et al. | |
| 2009/0125393 A1 | 5/2009 | Hwang et al. | |
| 2009/0168752 A1 | 7/2009 | Segel | |
| 2009/0259611 A1* | 10/2009 | Wang ................... H04L 67/52 706/47 | |
| 2010/0036954 A1 | 2/2010 | Sakata et al. | |
| 2010/0070603 A1 | 3/2010 | Moss et al. | |
| 2010/0202509 A1 | 8/2010 | Thompson et al. | |
| 2010/0228819 A1 | 9/2010 | Wei | |
| 2011/0019627 A1 | 1/2011 | Krishnaswamy et al. | |
| 2011/0078327 A1 | 3/2011 | Li et al. | |
| 2011/0196894 A1 | 8/2011 | Farber et al. | |
| 2012/0079524 A1 | 3/2012 | Kalidindi et al. | |
| 2012/0089843 A1 | 4/2012 | Kato et al. | |
| 2012/0297410 A1 | 11/2012 | Lohmar et al. | |
| 2013/0013377 A1 | 1/2013 | Kruglick | |
| 2013/0013688 A1 | 1/2013 | Wang et al. | |
| 2013/0268577 A1 | 10/2013 | Oyman | |
| 2014/0089998 A1 | 3/2014 | Buehl et al. | |
| 2014/0108671 A1 | 4/2014 | Watson et al. | |
| 2014/0149794 A1 | 5/2014 | Shetty et al. | |
| 2014/0164584 A1* | 6/2014 | Joe ..................... H04L 67/1021 709/223 | |
| 2014/0181285 A1 | 6/2014 | Stevens et al. | |
| 2014/0365613 A1 | 12/2014 | Phillips et al. | |
| 2015/0012593 A1 | 1/2015 | Phillips et al. | |
| 2015/0264413 A1 | 9/2015 | Buehl et al. | |
| 2015/0382057 A1 | 12/2015 | Huang et al. | |
| 2016/0234069 A1 | 8/2016 | Coudurier et al. | |
| 2016/0337426 A1 | 11/2016 | Shribman et al. | |
| 2017/0188059 A1 | 6/2017 | Major | |
| 2017/0188072 A1 | 6/2017 | Major | |
| 2017/0257287 A1* | 9/2017 | Kim .......................... G06F 8/41 | |
| 2018/0084306 A1* | 3/2018 | Hunter ............. H04N 21/25808 | |
| 2018/0167486 A1* | 6/2018 | Pacella ............... H04L 67/1097 | |
| 2018/0219932 A1 | 8/2018 | Natarajan et al. | |
| 2018/0241796 A1 | 8/2018 | Srinivasan et al. | |
| 2018/0373580 A1 | 12/2018 | Ertl et al. | |
| 2018/0376197 A1* | 12/2018 | Gonzalez ......... H04N 21/44016 | |
| 2021/0152882 A1 | 5/2021 | Xie et al. | |
| 2022/0182685 A1 | 6/2022 | Dai et al. | |
| 2022/0217432 A1 | 7/2022 | She et al. | |
| 2022/0303331 A1 | 9/2022 | Svennebring et al. | |
| 2023/0041976 A1 | 2/2023 | She et al. | |
| 2023/0418675 A1 | 12/2023 | Howe et al. | |
| 2024/0031420 A1 | 1/2024 | Dai et al. | |
| 2024/0205473 A1 | 6/2024 | Tian et al. | |

FOREIGN PATENT DOCUMENTS

| | | |
|---|---|---|
| CN | 103825837 B | 6/2017 |
| CN | 107251569 A | 10/2017 |
| CN | 107251569 B | 3/2020 |
| EP | 3257233 A1 | 12/2017 |
| EP | 3257233 A4 | 8/2018 |
| EP | 3742706 A1 | 11/2020 |
| EP | 4027616 A1 | 7/2022 |
| JP | 2012080394 A | 4/2012 |
| JP | 2020127130 A | 8/2020 |
| KR | 20100054661 A | 5/2010 |
| KR | 20220059425 A | 5/2022 |
| WO | 2014062581 A2 | 4/2014 |
| WO | 2022034619 A1 | 2/2022 |
| WO | 2022107669 A1 | 5/2022 |

OTHER PUBLICATIONS

European Search Report, Application No. 23184904.3, dated Oct. 25, 2023, 10 pages.
U.S. Appl. No. 17/142,982, filed Jan. 6, 2021, Qiang She.
U.S. Appl. No. 17/937,965, filed Oct. 4, 2022, Qiang She.
Chinese Application Serial No. 201680009559.8, Office Action dated Jun. 26, 2019, 21 pgs.
Dai et al., "Content Delivery Network (CDN) Selection Using Performance Metric," filed Aug. 24, 2022, U.S. Appl. No. 17/822,053, 45 pages.
European Application No. 22150150.5, Search Report mailed May 27, 2022, 9 pgs.
European Application Serial No. 16749817.9, Office Action dated May 6, 2019, 9 pgs.
Extended European Search Report & Opinion for EP Application 16749817.9, dated Jul. 20, 2018, 9 pages.
Howe et al., "Intelligent Content Delivery Network (CDN) Entity Routing," filed Jun. 27, 2022, U.S. Appl. No. 17/809,246, 42 pages.
International Search Report & Written Opinion dated Nov. 26, 2021, serial No. PCT/IN21/50781, 9 pages.
International Search Report & Written Opinion for PCT Application PCT/US2016/017380 mailed Jun. 8, 2016, 16 pages.
PID Controller, Wikipedia, Retrieved from the Internet on Jun. 27, 2022: https://en.wikipedia.org/wiki/PID_controller.
European Extended Search Report, Application No. 23204937.9, Dated Jan. 25, 2024, 11 pages.
Office Action for Japanese Application No. 2023-067009, dated Jun. 4, 2024, 3 pgs.

* cited by examiner

| | 402 | 404 | 406 | 408 | 410 | 412 | 414 | 416 |
|---|---|---|---|---|---|---|---|---|
| SERIAL NO. | NETWORK | GEOLOCATION | CONTENT | PRIORITY | CDN | EXPIRY | WEIGHT |
| 1. | * | * | * | P5 | C1 | | 0.5 |
| 2. | N1 | MUMBAI | * | P4 | C2 | | 1 |
| 3. | * | * | * | P5 | C3 | | 1 |
| 4. | N2 | * | * | P4 | N2C4 | | 0.5 |
| 5. | * | * | NEW MOVIE "ABC" | P0 | C5 | NULL | 1 |

400

SYSTEM AND METHOD FOR DELIVERING MEDIA CONTENT TO USERS

CROSS-REFERENCE TO RELATED APPLICATIONS

This application is a national application and, pursuant to 35 U.S.C. § 365, is entitled to and claims the right of priority based on international application no. PCT/IN2021/050781, filed Aug. 13, 2021, entitled "SYSTEM AND METHOD FOR DELIVERING MEDIA CONTENT TO USERS", which claims priority from Indian provisional patent application 202021035012, filed Aug. 14, 2020, all of which are incorporated herein in their entirety by this reference thereto.

TECHNICAL FIELD

The present technology generally relates to delivery of media content, such as streaming content, to end-users and, more particularly, to a system and method for selecting an optimal content delivery network (CDN) from among a plurality of CDNs for delivering media content to the users.

BACKGROUND

On-demand video streaming as well as live streaming of content has gained popularity in recent times, and users are increasingly using a variety of electronic devices to access such streaming content. Typically, the Over-The-Top (OTT) streaming content providers use a Content Delivery Network (CDN) to deliver streaming content to the end-users (i.e. viewing customers).

In most cases, a content provider entrusts a single CDN provider with delivering content to the end-users. A user's request for viewing/accessing content that is offered by the content provider is directed to the CDN provider, which identifies the nearest CDN point of presence (PoP) to deliver the requested content to the user. Generally, the CDN provider does not perform a check to determine whether the nearest CDN PoP is caching the content which was requested by the user or not. As a result, if the nearest CDN PoP does not include the requested content, the user's request is redirected to the next nearest CDN PoP. If the next nearest CDN PoP also does not include the requested content, the user's request for content may be redirected to a further next nearest CDN PoP or a default CDN, which maintains a copy of the requested content. Alternatively, instead of redirecting the request, the nearest CDN PoP may also attempt to fetch the requested content from the next nearest CDN PoP or from the default CDN. Multiple redirections among the CDNs or requests to fetch content from other CDNs/ default CDN may result in an increase in the time expended in providing the user with the requested content, thereby adversely affecting the user experience. Moreover, the redirections to CDNs do not take into account the health of the CDN and its current workload and whether the CDN is capable of effectively serving the user or not. As a result, a CDN with a poor history of serving customers may be charged with serving the user request, thereby negatively affecting the quality of interaction experience provided to the user. The multiple redirections also clog the network bandwidth, which may degrade the quality of viewing experience for other users as well.

Accordingly, there is a need to address the drawbacks of existing content delivery mechanisms, and deliver streaming content to the end users in a timely manner while maintaining a rich quality of viewing experience.

SUMMARY OF INVENTION

In an embodiment of the invention, a method for delivering media content to users is disclosed. The method receives, by a system, a request for a playback URL from an electronic device associated with a user. The request for the playback URL is received in relation to a content title. The method extracts, by the system, at least a network Autonomous System Number (ASN), an IP address and a content ID from the request for the playback URL. The content ID is related to the content title. The method determines, by the system, a location of the user based on the network ASN and the IP address. The method identifies, by the system, relevant Content Delivery Networks (CDNs) from among a plurality of CDNs based, at least in part, on the location of the user and the content ID. Each relevant CDN from among the relevant CDNs is in proximity of the user and stores content associated with the content title. The method selects, by the system, an optimal CDN from among the relevant CDNs based on at least one performance statistic and at least one predefined routing policy. The method provides, by the system, the playback URL to the electronic device in response to the request for the playback URL. The playback URL is configured to facilitate display of the content associated with the content title on the electronic device.

In an embodiment of the invention, a system for delivering media content to users is disclosed. The system includes a memory module and a processing module. The memory module stores instructions, that when executed by the processing module, cause the system to receive a request for a playback URL from an electronic device associated with a user. The request for the playback URL is received in relation to a content title. The system extracts at least a network Autonomous System Number (ASN), an IP address and a content ID from the request for the playback URL. The content ID is related to the content title. The system determines, by the system, a location of the user based on the network ASN and the IP address. The system identifies relevant Content Delivery Networks (CDNs) from among a plurality of CDNs based, at least in part, on the location of the user and the content ID. Each relevant CDN from among the relevant CDNs is in proximity of the user and stores content associated with the content title. The system selects an optimal CDN from among the relevant CDNs based on at least one performance statistic and at least one predefined routing policy. The system provides the playback URL to the electronic device in response to the request for the playback URL. The playback URL is configured to facilitate display of the content associated with the content title on the electronic device.

In another embodiment of the invention, a method for delivering streaming content to users is disclosed. The method receives, by a system, a request for a playback URL from an electronic device associated with a user. The request for the playback URL is generated by the electronic device in response to a selection of a streaming content title from among a plurality of streaming content titles displayed on the electronic device. The method extracts, by the system, at least a network Autonomous System Number (ASN), an IP address and a content ID from the request for the playback URL. The content ID is related to the streaming content title. The method determines, by the system, a location of the user based on the network ASN and the IP address. The method identifies, by the system, relevant Content Delivery Networks (CDNs) from among a plurality of CDNs based, at least in part, on the location of the user and the content ID. Each relevant CDN from among the relevant CDNs is in proximity of the user and stores the streaming content associated with the content title. The method generates, by the system, CDN related statistics and QoS statistics for each relevant CDN from among the identified relevant CDNs. The method selects, by the system, an optimal CDN from among the relevant CDNs based on the CDN related statistics, the QoS statistics and at least one predefined routing policy. The method generates the playback URL, by the system, based on an IP address associated with a CDN hostname of the selected optimal CDN. The method provides, by the system, the playback URL to the electronic device in response to the request for the playback URL. The electronic device is configured to generate a hypertext transfer protocol (HTTP) request based on the playback URL and fetch the streaming content from the optimal CDN using the HTTP request.

BRIEF DESCRIPTION OF DRAWINGS

The advantages and features of the invention will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 9. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The term 'media content' as used herein primarily refers to any multimedia content, such as streaming video content, which is delivered to a user's electronic device such as a mobile phone, a personal computer or a television set in response to user's demand for content. Hereinafter, the term 'media content' is also interchangeably referred to as 'content' or 'streaming content' for purposes of the description.

Figure 1:
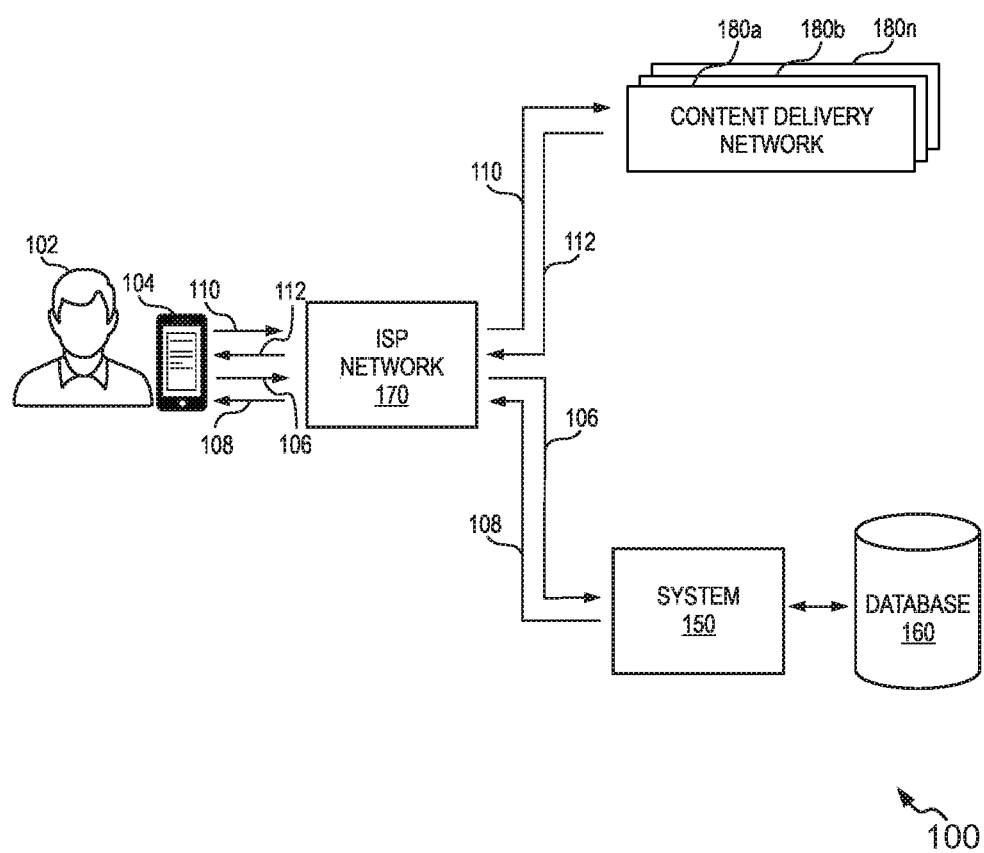
FIG. 1 shows a representation for illustrating the delivery of media content offered by a streaming content provider to a user, in accordance with an embodiment of the invention.

FIG. 1 shows a representation 100 for illustrating the delivery of media content offered by a streaming content provider to a user 102, in accordance with an embodiment of the invention.

The term 'streaming content provider' as used herein refers to an owner of digital video content libraries, who offers the video content on subscription basis by using a digital platform and over-the-top (OTT) media services, i.e. the video content is streamed over the Internet to the electronic devices of the subscribers. A streaming content provider is hereinafter referred to as a 'content provider' for ease of description.

The content offered by the content provider may be embodied as streaming video content such as live streaming content or on-demand video streaming content. Individuals wishing to view/access the content may subscribe to at least one type of subscription offered by the content provider. Accordingly, the term 'subscriber' or 'user' as interchangeably used herein may refer to a viewer of subscribed content, which is offered by the content provider.

The delivery of content to a user in response to the user's request for accessing such content is explained hereinafter with reference to an illustrative example in FIG. 1. It is noted that the content provider is not shown in FIG. 1. The content provided by the content provider may be cached in one or more content delivery networks (CDNs), such as CDNs 180*a*, 180*b* and 180*n* (hereinafter referred to as plurality of CDNs 180*a*-180*n*) shown in FIG. 1. Further, the information related to the CDNs and the availability of the content in those CDNs may be populated in a database 160 shown in FIG. 1.

The representation 100 depicts the user 102 controlling an electronic device 104 for viewing/accessing content offered by the content provider. The electronic device 104 is depicted to be a smartphone for illustration purposes. It is noted that the user 102 may use one or more electronic devices, such as a television (TV), a laptop, a smartphone, a desktop or a personal computer to view the content provided by the content provider.

In one illustrative example, the user 102 may access a Web interface associated with a content provider by using the electronic device 104. It is understood the electronic device 104 may be in operative communication with a communication network, such as the Internet, enabled by a network provider, also known as the Internet Service Provider (ISP). One example ISP network is depicted as an ISP network 170 in the representation 100. The electronic device 104 may connect to the ISP network 170 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like. The electronic device 104 may fetch the Web interface associated with the content provider over the ISP network 170 and cause display of the Web interface on a display screen of the electronic device 104. In an illustrative example, the Web interface may include a plurality of content titles corresponding to the content offered by the content provider to its subscribers.

In an illustrative example, the user 102 may select a content title from among the plurality of content titles displayed on the display screen of the electronic device 104. The selection of the content title may trigger a request for a playback uniform resource locator (URL). The request for the playback URL is sent from the electronic device 104 via the ISP network 170 to a system 150 associated with the content provider. The transmission of the request for the playback URL from the electronic device 104 to the system 150 is exemplarily depicted using a communication link 106.

In at least one embodiment, the system 150 is configured to authenticate the user 102 and determine if the user 102 is entitled to view the requested content. To this effect, the system 150 may be in operative communication with one or more remote servers, such as an authentication server and an entitlement server. The authentication server and the entitlement server are not shown in FIG. 1. The authentication server may facilitate authentication of account credentials associated with the user 102 using standard authentication mechanisms, which are not explained herein. The entitlement server may facilitate in determination of the user's subscription type (i.e. whether the user has subscribed to regular or premium content) and status (i.e. whether the subscription is still active or is it expired) from the account credentials, which in turn may enable determination of whether the user 102 is entitled to view/access the requested content or not.

The system 150 determines a location of the user 102 by extracting a network Autonomous System Number (ASN) and an IP address from the request for the playback URL. Further, the system 150, in conjunction with the database 160, identifies all CDNs, which are in the proximity of the location of the user 102 and which store the requested content. The system 150 then identifies a most optimal CDN from among the plurality of CDNs 180a-180n for serving the user 102 with the requested content. The system 150 is configured to take into account, the location of the user, a content ID, performance metrics associated with the plurality of CDNs 180a-180n, and one or more routing policies for determining the most optimal CDN for serving the requested content to the user 102. The determination of the optimal CDN is explained in detail with reference to FIGS. 2 to 6. The system 150 is further configured to generate a playback URL based, at least in part, on the network/IP address associated with the optimal CDN. The system 150 is further configured to generate a token subsequent to the determination of the optimal CDN. The token may be embodied as a hash-based message authentication code (HMAC) token.

The system 150 provides the playback URL along with the token to the electronic device 104. The transmission of the playback URL and the token from the system 150 to the electronic device 104 via the ISP network 170 is exemplarily depicted using a communication link 108. The electronic device 104 may be configured to generate a Hypertext Transfer Protocol (HTTP) request using the playback URL and provide the token along with HTTP request over the ISP network 170 to the optimal CDN (i.e. the CDN identified in the HTTP request) to fetch the requested content and provide the content to the user 102. The transmission of the HTTP request and the token from the electronic device 104 to the CDN over the ISP network 170 is exemplarily depicted using a communication link 110. The delivery of the content from a CDN, such as the CDN 180a, to the electronic device 104 via the ISP network 170 is exemplarily shown using the communication link 112.

Figure 2:
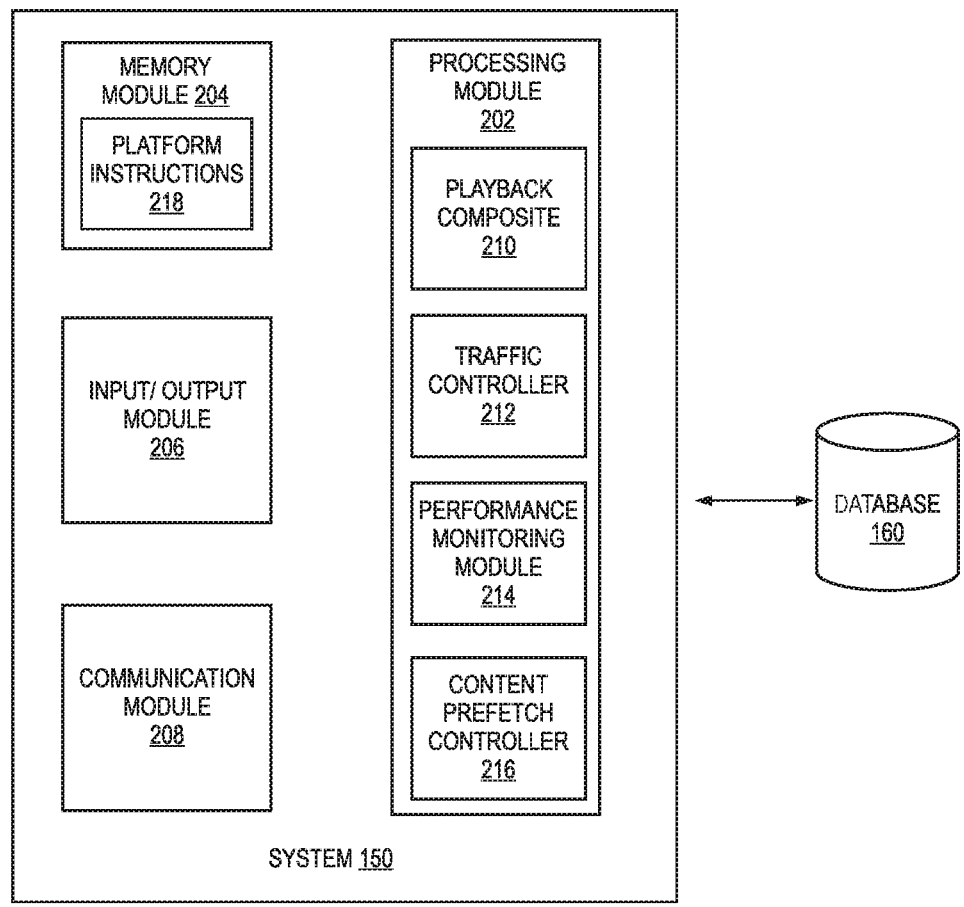
FIG. 2 is a block diagram of a system configured to select an optimal CDN for delivering media content to users, in accordance with an embodiment of the invention.

FIG. 2 is a block diagram of the system 150 configured to select an optimal CDN for delivering media content to users, in accordance with an embodiment of the invention. The system 150 is depicted to include a processing module 202, a memory module 204, an input/output (I/O) module 206 and a communication module 208. It is noted that although the system 150 is depicted to include the processing module 202, the memory module 204, the input/output (I/O) module 206 and the communication module 208, in some embodiments, the system 150 may include more or fewer components than those depicted herein. The various components of the system 150 may be implemented using hardware, software, firmware or any combination thereof. Further, it is also noted that one or more components of the system 150 may be implemented in a single server or a plurality of servers, which are remotely placed from each other.

In one embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In one embodiment, the memory module 204 is capable of storing machine executable instructions, referred to herein as platform instructions 218. Further, the processing module 202 is capable of executing the platform instructions 218. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed. The processing module 202 is depicted to include a playback composite 210, a traffic controller 212, a performance monitoring module 214, and a content prefetch controller 216.

The memory module 204 stores instructions/code configured to be used by the processing module 202, or more specifically by the various modules of the processing module 202 such as the playback composite 210, the traffic controller 212, the performance monitoring module 214, and the content prefetch controller 216 to perform respective functionalities, as will be explained in detail with reference to FIGS. 2 to 7. The memory module 204 may be embodied as one or more non-volatile memory devices, one or more volatile memory devices and/or a combination of one or more volatile memory devices and non-volatile memory devices. For example, the memory module 204 may be embodied as semiconductor memories, such as flash memory, mask ROM, PROM (programmable ROM), EPROM (erasable PROM), RAM (random access memory), etc. and the like.

In an embodiment, the I/O module 206 may include mechanisms configured to receive inputs from and provide outputs to an operator of the system 150. The term 'operator of the system 150' as used herein may refer to one or more individuals, whether directly or indirectly associated with managing the digital OTT platform on behalf of the content provider. To enable reception of inputs and provide outputs to the system 150, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In an example embodiment, at least one module of the system 150 may include I/O circuitry (not shown in FIG. 2) configured to control at least some functions of one or more elements of the I/O module 206, such as, for example, a speaker, a microphone, a display, and/or the like. The module of the system 150 and/or the I/O circuitry may be configured to control one or more functions of the elements of the I/O module 206 through computer program instructions, for example, software and/or firmware, stored on a memory, for example, the memory module 204, and/or the like, accessible to the processing module 202 of the system 150.

The communication module 208 is configured to facilitate communication between the system 150 and one or more remote entities over a communication network. For example, the communication module 208 is capable of facilitating communication with electronic devices of content viewers, with ISPs, with edge servers associated with CDNs, with content ingestion servers, and the like.

The system 150 is depicted to be in operative communication with a database 160. The database 160 is any computer-operated hardware suitable for storing and/or retrieving data. In one embodiment, the database 160 is configured to store ASN/IP pool, CDN registration data, CDN-content map, routing policies, real-time metrics of CDNs, heartbeat information received from user electronic devices, hostnames for CDNs, and the like. The database 160 may include multiple storage units such as hard drives and/or solid-state drives in a redundant array of inexpensive disks (RAID) configuration. In some embodiments, the database 160 may include a storage area network (SAN) and/or a network attached storage (NAS) system. In one embodiment, the database 160 may correspond to a distributed storage system, wherein individual databases are configured to store custom information, such as routing policies, ASN/IP pool, CDN registration data, etc.

In some embodiments, the database 160 is integrated within the system 150. For example, the system 150 may include one or more hard disk drives as the database 160. In other embodiments, the database 160 is external to the system 150 and may be accessed by the system 150 using a storage interface (not shown in FIG. 2). The storage interface is any component capable of providing the processing module 202 with access to the database 160. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 with access to the database 160.

As explained with reference to FIG. 1, the user 102 may click on a content title displayed on a display screen associated with a user's electronic device 104. The selection of the content title may trigger a request for a playback URL from the user's electronic device 104 to the system 150. In at least one example embodiment, the communication module 208 may facilitate reception of the request for the playback URL from the electronic device 104 associated with the user 102. The communication module 208 may be configured to forward the request for the playback URL to the playback composite 210 of the processing module 202. The processing of the request for the playback URL by the playback composite 210 and other components of the system 150 is explained with reference to FIG. 3.

Figure 3:
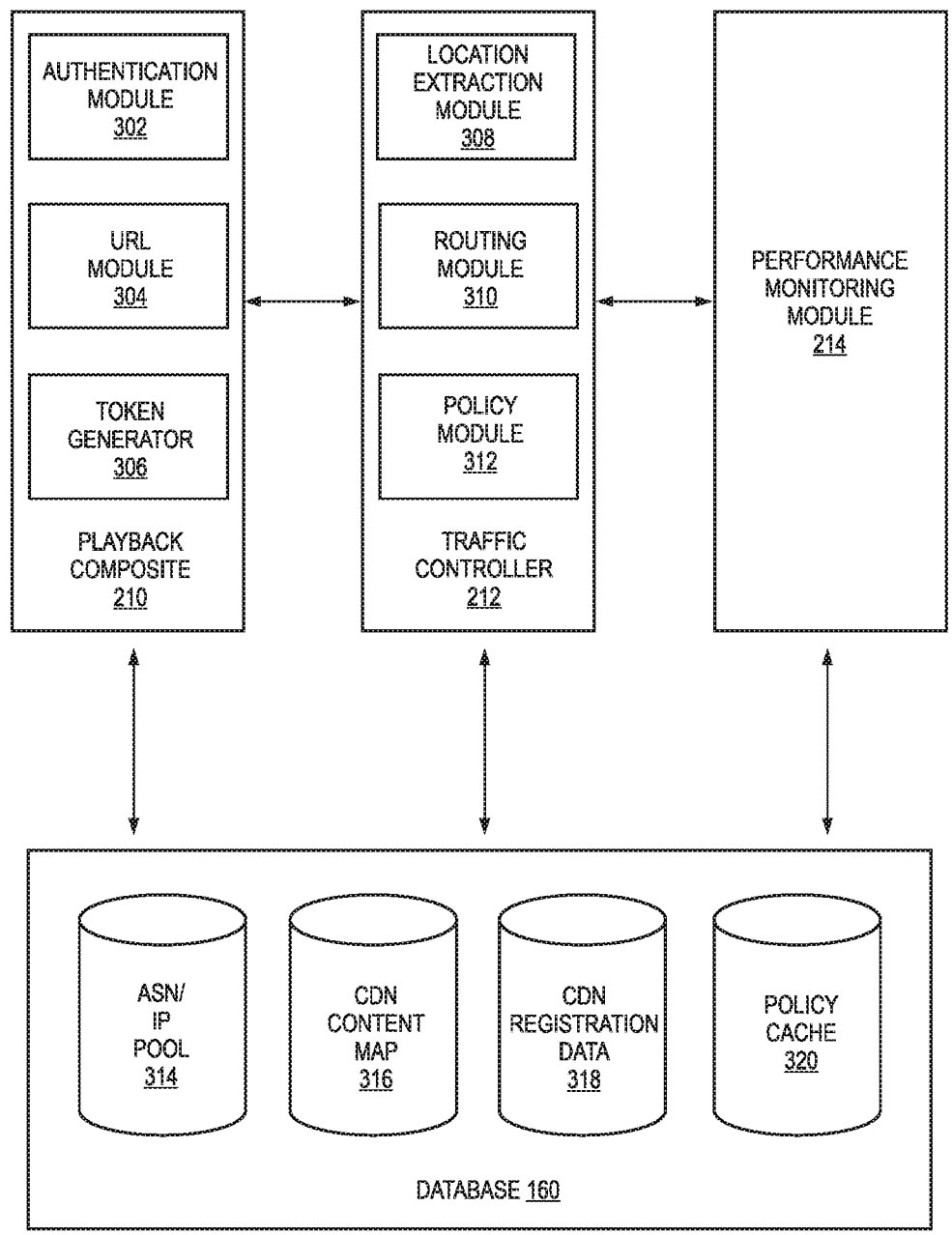
FIG. 3 is a block diagram illustrating example components of a playback composite and a traffic controller for processing a request for a playback URL, in accordance with an embodiment of the invention.

Referring now to FIG. 3, a block diagram 300 illustrating example components of the playback composite 210 and the traffic controller 212 for processing a request for a playback URL is shown, in accordance with an embodiment of the invention. The playback composite 210 and the traffic controller 212 may be configured to utilize the instructions/code stored in the memory module 204 (shown in FIG. 2) for performing various respective functionalities, which are described in detail hereinafter.

The playback composite 210 is depicted to include an authentication module 302, a URL module 304 and a token generator 306. As explained with reference to FIG. 2, the communication module 208 of the system 150 is configured to receive the request for the playback URL. The request for the playback URL may be forwarded to the playback composite 210 of the processing module 202 by the communication module 208. In at least one embodiment, the authentication module 302 in the playback composite 210 is configured to receive the request for the playback URL.

The authentication module 302 is configured to extract information related to the account credentials associated with the user 102 from the request for the playback URL. Further, a content ID uniquely identifying the content associated with the content title may also be extracted from the request for the playback URL. The authentication module 302 is configured to perform an authentication check, i.e., determine if the user 102 is an authentic user or not, and perform an entitlement check, i.e., determine whether the user 102 is entitled to view the requested content or not. To this effect, the authentication module 302 may be in operative communication with one or more remote servers, such as an authentication server and an entitlement server. The authentication server and the entitlement server are not shown in FIG. 3. The authentication server may facilitate authentication of account credentials associated with the user 102 using standard authentication mechanisms, such as SMS (for example, sending an one-time password on the user's registered mobile phone), Email and Interactive Voice Response System (IVRS) based authentication modes. The entitlement server may facilitate in determination of the user's subscription type (i.e. whether the user 102 has subscribed to regular or premium content) and status (i.e. whether the subscription is still active or is it expired), which in turn may enable determination of whether the user 102 is entitled to view/access the requested content or not. Subsequent to the successful completion of the authentication/ entitlement checks, the authentication module 302 is configured to forward the request for the playback URL to the traffic controller 212.

The traffic controller 212 is designed to be an intelligent, content-aware sub-system capable of selecting the most optimal CDN from among the plurality of CDNs for each user request for the playback URL as will be explained in detail hereinafter. It is noted that, in at least some embodiments, the term most optimal CDN may also include the most optimal CDN point of presence (PoP) or the most cost and/or performance effective PoP within the optimal CDN. Further, the term 'intelligent and content-aware' sub-system as used herein may imply that the traffic controller 212 is not only aware of what content is available in each CDN but also of the attributes of the content, such as the quality of resolution (for example, high definition resolution or normal resolution), the availability of multilingual versions of the content, such as for example a language dubbed version, etc. Accordingly, the traffic controller 212 is not only intelligent enough to identify the most cost and/or performance effective CDN based on availability of content, but also is configured to factor in the availability of at least one attribute in relation to the content, such as a quality of resolution (for example, high definition resolution) or the presence of the multilingual versions of the content, etc., when identifying the most optimal CDN.

The traffic controller 212 is depicted to include a location extraction module 308, a routing module 310 and a policy module 312.

The location extraction module 308 is configured to identify a location (country/region/city) of the user based on the request for the playback URL. To this effect, the location extraction module 308 is configured to extract a network's Autonomous System Number (ASN) and/or IP address from the request for the playback URL. It is understood that each network provider/ISP (or a telecommunications operator) is associated with an ASN. The ASN and the user's IP address extracted from the request for the playback URL are then compared with a pre-populated database of information referred to herein as 'ASN/IP pool 314' in the database 160. In at least some embodiments, the ASN/IP pool 314 in the database 160 is pre-populated using ASN and IP address information offered by third-party vendors, or, from data provided by individual ISPs. More specifically, the third-party vendors and/or ISPs may provide information related to which ASN/IP addresses are associated with which country/city/region. In some embodiments, the system 150 may learn what IP addresses/ASNs correspond to which country/city/region over time, and accordingly create its own IP pool, which configures the ASN/IP Pool 314. The comparison of the ASN and the user's IP address extracted from the request for the playback URL with the information stored in the pre-populated ASN/IP pool 314 may facilitate in the determination of the network that the user 102 is using and the user's current geolocation indicating high-level location information such as the user's country, region and city information.

In at least some embodiments, the location extraction module 308 is also configured to receive the content ID, i.e. a unique identifier associated with the content requested by the user 102, from the playback composite 210. Alternatively, the location extraction module 308 may extract the content ID from the user's request for the playback URL. The location extraction module 308 is configured to provide the information related to the location of the user and the content ID to the routing module 310.

The routing module 310 is configured to use the location of the user 102 and the content ID to identify relevant CDNs from among a plurality of CDNs. For the purposes of the description, CDNs in proximity of the user 102 within the user's home network/peering network and, which include the content associated with the content ID are referred to as relevant CDNs, hereinafter. In at least one embodiment, the routing module 310 may refer to a CDN content map 316 stored in the database 160 to run a query with the location of the user 102 and the content ID to identify the relevant CDNs. The CDN content map 316 may include CDN registration data, such as Network ASN, Country/Region/State/City, Prefetch API URL and Playback URL hostname. The CDN content map 316 may also include metadata attributes around content actors, description, title, broadcast date (for example, broadcast date for episodic content), and the like. The information stored in the CDN content map 316 may be used to identify the relevant CDNs for servicing the user's request for content.

In at least one embodiment, the routing module 310 is also configured to receive at least one performance statistic related to the relevant CDNs from the performance monitoring module 214.

In at least some embodiments, the performance monitoring module 214 is configured to periodically collect statistical information related to each CDN from among the plurality of CDNs. To this effect, the performance monitoring module 214 is configured to identify the plurality of CDNs using the CDN registration data 318 in the database 160. The plurality of CDNs may include one or more CDNs from among private CDNs, public CDNs, CDNs associated with OTT content providers, CDNs associated with ISPs, and the like. The statistical information related to each CDN is hereinafter referred to as 'CDN related statistics'. The CDN related statistics for the plurality of CDNs may be manually fed into the performance monitoring module 214 by the operator of the system 150, or, the performance monitoring module 214 may periodically poll the CDNs for CDN related statistics. In some embodiments, the CDNs may generate respective statistics and automatically upload the statistics to the performance monitoring module 214. In some embodiments, the performance monitoring module 214 may be configured to track HTTP status codes, which are transmitted by the CDNs to the users and/or to the system 150 in response to the HTTP requests for playback content received from the users. The HTTP status codes may be indicative of whether the delivery of the playback content was successful or an error was encountered during servicing of individual user requests. The performance monitoring module 214 may track HTTP status codes sent out by various CDNs and also correlate the HTTP status codes with status information received from electronic devices of the users being serviced by the respective CDNs to generate the CDN related statistics. In an illustrative example, in case of private CDNs, the CDN related statistics may include information, such as a Central Processing Unit (CPU) utilization, a memory utilization, a storage IO utilization, a network bandwidth utilization, network connections utilization, file descriptors utilization, a cache storage utilization and a peering bandwidth utilization. In case of public CDNs, the CDN related statistics may include information, such as a network bandwidth utilization, network connections utilization and a peering bandwidth utilization.

In addition to the CDN related statistics, the performance monitoring module 214 may receive heartbeat information from electronic devices of a plurality of users, such as the user 102. For example, the performance monitoring module 214 may receive heartbeat information from one or more electronic devices of the user 102. Further, the performance monitoring module 214 may receive heartbeat information from other users, who are associated with the network ASN of the user 102, the location of the user 102 or a CDN from among the relevant CDNs. More specifically, the performance monitoring module 214 may receive heartbeat information from electronic devices of: (1) other users in the region associated with the user 102, (2) other users who share the same ASN, and (3) other users who share one or more CDNs from among the relevant CDNs for receiving content.

The heartbeat information may be used to extract parameters, such as those related to comprehensive user experience score, playback success score, start-up time score, smoothness score, video quality score, and the like. The extracted parameters may be used to derive insights, such as whether a particular CDN served content to the user 102 in the past or not, how was the user's experience when the CDN served the content to the user 102, the genre of the content served by the CDN, and the like. Such derived statistical information may be used to configure Quality of Service (QoS) statistics for each CDN. The performance monitoring module 214 may be configured to generate QoS statistics for a combination of CDN, ASN and region from the heartbeat information received from the user 102 and the other users. In at least some embodiments, the CDN related statistics and QoS statistics related to each relevant CDN are utilized by the performance monitoring module 214 to generate at least one performance statistic corresponding to each relevant CDN. In one illustrative example, performance statistics, or more specifically information characterizing a performance of a CDN, may include information related to statistical metrics such as peak latency, average latency, maximum throughput, average throughput, average traffic load, average error rate, average buffer rate and the like. Such performance statistics may be generated from the CDN related statistics and the QoS statistics in relation to each relevant CDN. In at least one embodiment, the performance monitoring module 214 is configured to provide at least one performance statistic to the routing module 310 in the traffic controller 212.

The routing module 310 is also configured to extract at least one predefined routing policy from the policy cache 320. In at least one embodiment, an operator of the system 150 may use the I/O module 206 to define routing policies/rules and assign weights and priorities to the plurality of CDNs in the policy module 312. In some embodiments, machine learning algorithms may be employed to automatically generate the routing policies/rules and assign weights and priorities to the plurality of CDNs. The machine learning algorithms may be configured to take into account CDN related statistics and QoS statistics to automatically generate the routing policies/rules and assign weights and priorities to the CDNs. The routing policies, the weights and priorities assigned to the CDNs in the policy module 312 are stored in the policy cache 320. Accordingly, each relevant CDN may be associated with a respective weight and a respective priority. In at least one embodiment, the routing policies are set based on the ASN, the user location and the content ID. For example, a routing policy may be defined to route all traffic in a 60:40 ratio between a first CDN and a second CDN in the Mumbai region, and/or route 100% traffic from network provider N1 to a CDN associated with the network provider N1. The combination of parameters related to the content ID, the geolocation (e.g., region/city information) and the network ASN may be used to assign weights and priorities for directing individual playback requests of users, and in general, routing user traffic.

The term 'weight' as used herein implies a value indicative of a proportion of traffic that is to be attributed to a CDN. For example, a weight may be assigned to determine how traffic should be shared between CDNs if multiple CDNs were identified as relevant CDNs based on the location of the user and the content ID extracted from user requests for playback URLs. In at least one embodiment, the weight may be computed using a cumulative distribution function, which is configured to allocate traffic to CDNs based on a probabilistic measure. In one illustrative example, for a given user, a CDN X may be selected in one attempt and CDN Y may be selected in a subsequent attempt to distribute traffic across CDNs X and Y. The term 'priority' as used herein may indicate an order of selecting a CDN if multiple CDNs are deemed equivalent subsequent to weight based evaluation of CDN as per various routing policies. For example, if the same weight was assigned to two or more qualifying CDNs, then a priority may be set to select the optimal CDN. Further, if multiple CDNs are associated with the same priority and weight, then a random CDN may be selected from among the qualifying CDNs. An illustrative example of weights/priorities set for combinations of ISPs/CDNs is shown in FIG. 4.

Figure 4:
FIG. 4 shows a portion of a simplified tabular representation for illustrating an example assignment of weights and priorities to CDNs, in accordance with an embodiment of the invention.

Referring now to FIG. 4, a portion of a simplified tabular representation 400 is shown for illustrating an example assignment of weights and priorities to CDNs, in accordance with an embodiment of the invention. It is understood that a representation in a tabular form is depicted for example purposes and that any data structure may be used for representing the weights/priorities assigned to the CDNs.

The tabular representation 400 (hereinafter referred to as 'table 400'), depicts a plurality of columns such as columns 402, 404, 406, 408, 410, 412, 414 and 416, which are associated with column headers 'Serial No.', 'Network', 'Geolocation', 'Content', 'Priority', 'CDN', 'Expiry' and, 'Weight', respectively. It is noted that the tabular representation 400 may include more or fewer number of columns than those depicted in FIG. 4. Moreover, parameters represented by the columns may not be limited to those depicted in the tabular representation 400 and, indeed a variety of parameters defined by the OTT content provider or the CDN provider may be recorded in the tabular representation 400. Further, at least some parameters may be extracted from the request for the playback URL, whereas the remaining parameters may be derived by the system 150. For example, the parameters, such as network, geolocation and content may be extracted from the user's request, whereas parameters such as priority, CDN, expiry and weight may be defined by the system 150.

The column 404 associated with the column header 'Network' is exemplarily depicted to include two entries for network providers N1 and N2. The column 406 associated with the column header 'Geolocation' is exemplarily depicted to include a single entry for geolocation 'Mumbai'. Further, the column 408 associated with the column header 'Content' is exemplarily depicted to include an entry for a new movie 'ABC' accessible on CDN C5. In the column 412 associated with the column header 'CDN', each entry in the column corresponds to a CDN, exemplarily depicted as C1, C2, C3, N2 C4 (i.e. CDN associated with the network provider N2) and C5. The priorities and weights assigned by the operator of the system 150 to each CDN are shown as entries in the columns 410 and 416 associated with column headers 'Priority' and 'Weight', respectively. The column 414 associated with the column header 'Expiry' is depicted to include an entry recording the expiry of the cached movie 'ABC' on CDN C5. As explained with reference to FIG. 3, the combination of parameters related to the content ID, the geolocation (e.g., region/city information) and the Network ASN are used to assign weights and priorities to each CDN. It is noted that the asterisk '*' symbol shown in the entries of several columns of the table 400 represents a universal entry capable of assuming any value within a set defined by the operator of the system 150 in relation to the corresponding parameter. For example, the entries showing the * symbol in the column 404 associated with the parameter 'Network' may represent any network provider from among a set of network providers associated with the content provider.

In an illustrative example, a routing policy may be defined for always selecting the CDN C5 for the new movie 'ABC' from all locations as the CDN C5 may be most reliable (i.e. the CDN C5 is associated with the highest weight) among all CDNs. In another illustrative example, a routing policy may correspond to selecting the CDN 'N2 C4' for a user from network provider/ISP N2. In yet another illustrative example, a routing policy may correspond to selecting CDN C2 if the user is from geolocation 'Mumbai' and network N1. Similarly, routing policies for balancing traffic globally between two CDNs, such as CDN C1 and C3 for example, may be set.

Referring back to FIG. 3, the routing module 310 extracts at least one predefined routing policy from the policy cache 320 and identifies the most optimal CDN for the user 102 based on the performance statistics of the CDNs and extracted predefined routing policies. In one illustrative example, performance statistics related to the relevant CDNs, such as those related to latency and bandwidth/throughput, may be compared with preset performance thresholds. For example, latency of a relevant CDN must be below a preset latency threshold and the bandwidth/throughput of the relevant CDN must be above a preset bandwidth threshold. The CDNs from among the relevant CDNs, which qualify such a threshold based evaluation may be subjected to weight and priority based evaluation as set by the routing policy to determine the most optimal CDN (or the most optimal CDN PoP) for servicing the request for playback content received from the user 102. For example, if CDN A and CDN B qualify the threshold based evaluation and are associated with weight A and weight B respectively, where A is greater than B, then CDN A may be selected as the most optimal CDN. Alternatively, if the two qualifying CDNs, i.e. CDN A and CDN B, have equal weights as per the routing policy, then respective priorities may be checked and a CDN associated with a higher priority may be selected for servicing the request for playback content received from the user 102. In case, the priorities of the CDNs are also equal, then any random CDN from among the qualifying CDNs with equal weights may be selected for servicing the request for playback content received from the user 102. It is noted the term 'most optimal CDN' or 'optimal CDN' as interchangeably used herein implies a CDN or a CDN PoP, which is most performance effective in terms of latency and viewing quality, from an end-user perspective. Further, the most optimal CDN may also be the most cost and/or performance effective from the content provider perspective. In some embodiments, the most optimal CDN may be selected based on at least one category from among the categories related to the nearest CDN, CDN within home network, CDN peering with the home network, live content CDN, Video On-Demand (VOD) CDN, and the like.

In at least one embodiment, the traffic controller 212 is configured to provide the selection of the optimal CDN to the playback composite 210. In at least one embodiment, the URL module 304 of the playback composite 210 may be configured to refer to either the CDN Registration Data 318 in the database 160 or a remote content management system (CMS) associated with the content provider to retrieve the CDN hostname for the selected CDN and generate the playback URL for the CDN. In at least some embodiments, the URL module 304 is configured dynamically determine an IP address associated with a CDN hostname of the optimal CDN at runtime. The URL module 304 is further configured to include the IP address in a pre-fed or static URL format to generate a playback URL.

If the playback URL was successfully generated for the user 102, then the token generator 306 is configured to generate a token subsequent to the determination of the optimal CDN. The token may be embodied as a hash-based message authentication code (HMAC) token. The playback composite 210 may then be configured to provide the token generated by the token generator 306 along with playback URL to the electronic device 104 (shown in FIG. 1) associated with the user 102 in response to the user's request for the playback URL. More specifically, the communication module 208 (shown in FIG. 2) of the system 150 may facilitate transmission of the token and the playback URL to the electronic device 104 associated with the user 102. Further, as explained with reference to FIG. 1, the electronic device 104 of the user 102 may be configured to use the playback URL to generate an HTTP request for requesting content and transmit the HTTP request along with the token over the ISP network 170 (shown in FIG. 1). The ISP network 170 may facilitate the transmission of the user's request for content to the appropriate CDN (i.e. the selected optimal CDN) to fetch the desired content for the user 102.

In some scenarios, during identification of the optimal CDN, it may be determined that the content may not be available in the CDN PoPs in the proximity of the user 102. In such a scenario, the traffic controller 212 may provide an indication of such an event to the playback composite 210. The URL module 304 in the playback composite 210 may be configured to generate a 'fallback URL', which is indicative of an error. Further, if the authentication/entitlement check is not successful during the initial evaluation of the request for the playback URL, the authentication module 302 is configured to provide a failed status of the check to the URL module 304, which may be configured to generate the appropriate error message to be provided to the user 102. The fallback URL/error message may then be provided to the electronic device 104 associated with the user 102 in response to the user's request for the playback URL. More specifically, the communication module 208 of the system 150 may facilitate transmission of the fallback URL/error message to the electronic device 104 associated with the user 102.

In at least some embodiments, the system 150 may cause the CDNs to prefetch the content from a default CDN, which may be populated with content from a content ingestion server associated with the content provider. Referring now to FIG. 2, the content prefetch controller 216 in the system 150 may be configured to notify the CDNs about the availability of fresh content and enables the CDNs to prefetch the content from the default CDN/content origin. In at least some embodiments, the prefetching of content at the CDN PoP may be based on historical traffic patterns/consumption of the content at that CDN PoP/location. In some embodiments, the prefetching of the content may be performed at episode level, such that any new release (episode/series) related to the content may be automatically pushed to the CDN PoPs if previous episodes/series were prefetched. Thus, system 150 enables placing of content based on the network ASN/location of the requesting users and this allows the content to be available at a location nearest to the users. An example process flow for prefetching of content is explained later with reference to FIG. 7.

Figure 5:
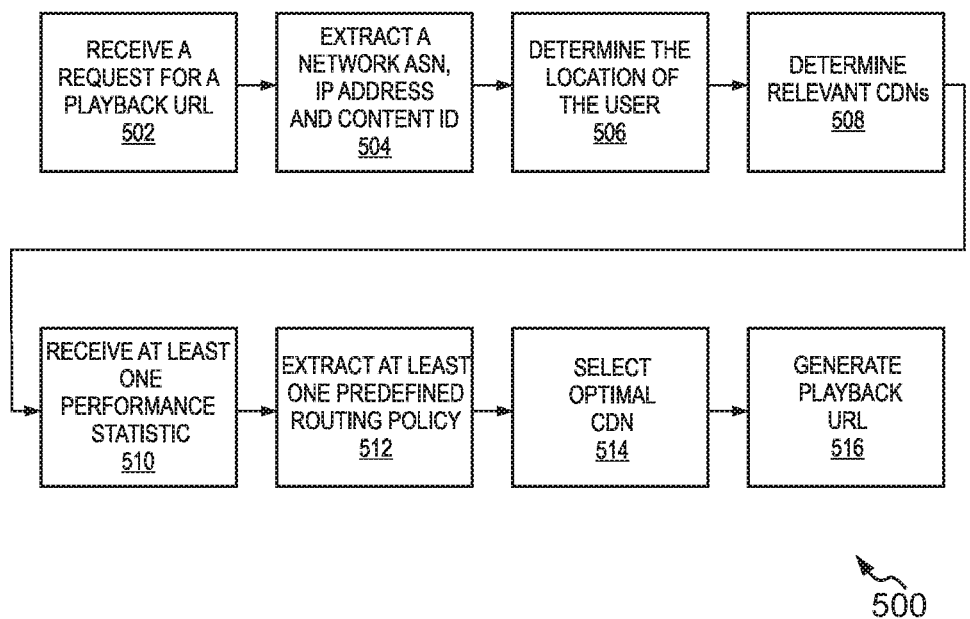
FIG. 5 is a representation showing an example process flow executed by the traffic controller to select the most optimal CDN from among the plurality of CDNs, in accordance with an embodiment of the invention.

FIG. 5 is a representation 500 showing an example process flow executed by the traffic controller 212 (shown in FIGS. 2 and 3) to select the most optimal CDN from among the plurality of CDNs, in accordance with an embodiment of the invention. The process flow starts at 502.

At 502, the traffic controller 212 receives a user's request for a playback URL from the playback composite 210.

At 504, the traffic controller 212 extracts a network ASN, IP address and content ID from the request for the playback URL.

At 506, the traffic controller 212 determines the location of the user from the network ASN and the IP address.

At 508, the traffic controller 212 determines the relevant CDNs based on the content ID and the location of the user. As explained with reference to FIG. 3, CDNs in proximity of the user within the user's home network/peering network and, which include the content associated with the content ID are referred to as relevant CDNs.

The determination of the relevant CDNs may be performed as explained with reference to FIG. 3 and is not explained herein.

At 510, the traffic controller 212 receives at least one performance statistic in relation to the relevant CDNs. As explained with reference to FIG. 3, the performance statistics may be generated based on CDN related statistics and QoS statistics related to the relevant CDNs.

At 512, the traffic controller 212 extracts at least one predefined routing policy from the policy cache 320 in the database 160.

At 514, the traffic controller 212 selects the most optimal CDN from among the relevant CDNs based on the at least one performance statistic and the at least one predefined routing policy.

At 516, the traffic controller 212 provides the selection of the most optimal CDN to the playback composite 210 for generation of the playback URL corresponding to the selected CDN. The process flow ends at 516.

Figure 6:
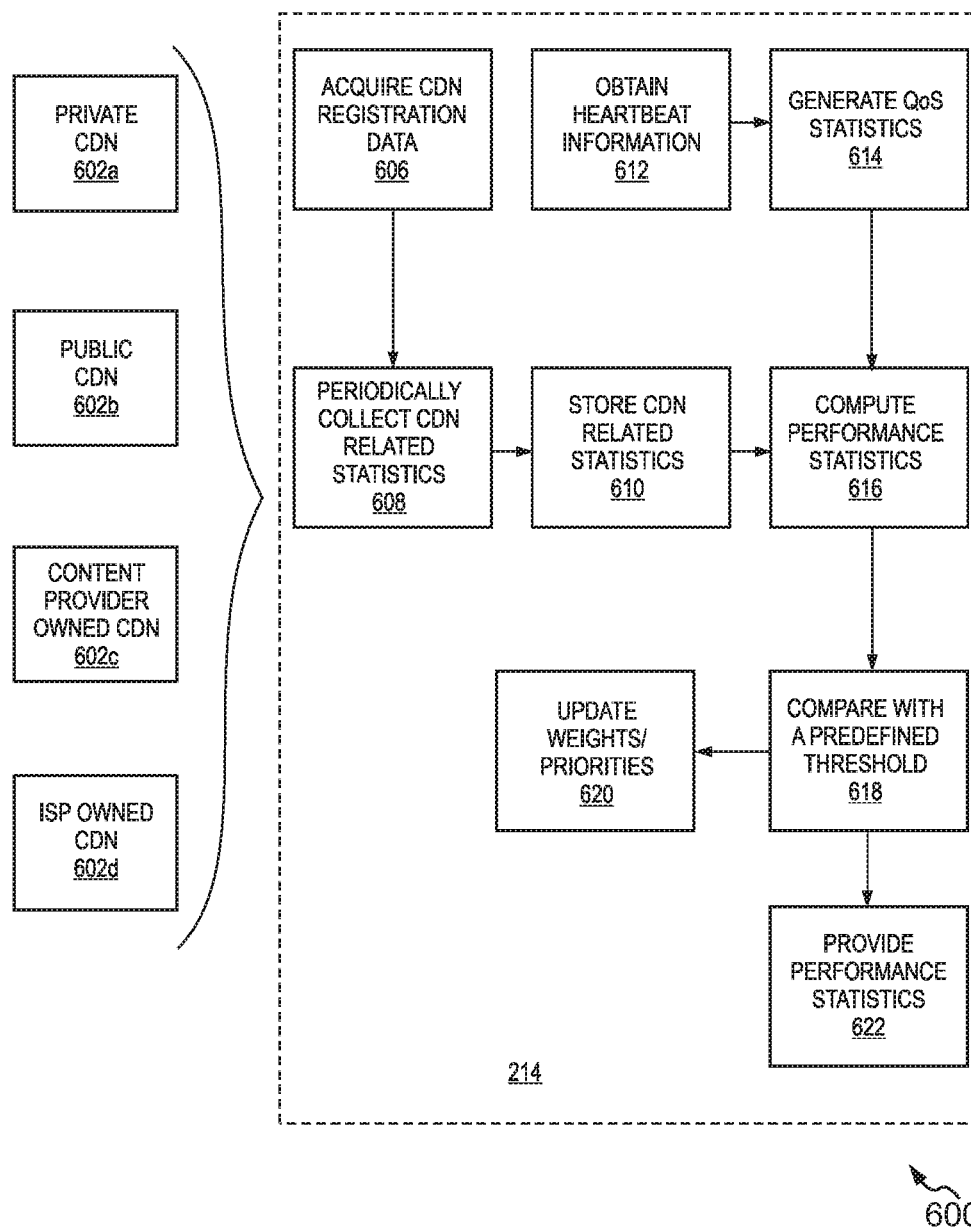
FIG. 6 is a representation for illustrating an example generation of performance statistics by a performance monitoring module, in accordance with an embodiment of the invention.

FIG. 6 shows an example representation 600 for illustrating the generation of performance statistics by the performance monitoring module 214 (shown in FIG. 2), in accordance with an embodiment of the invention.

The representation 600 is exemplarily depicted to include a plurality of CDN types, such as a private CDN 602a, a public CDN 602b, a content provider owned CDN 602c and an ISP owned CDN 602d. It is understood that the plurality of CDN types may include fewer or more types of CDNs than those depicted in the representation 600. Moreover, the performance statistics may be fetched in relation to one or more types of CDN from among the CDN types depicted as 602a to 602d.

At 606, the performance monitoring module 214 (shown in dotted block) acquires the CDN registration data identifying the plurality of CDNs from the database 160 (shown in FIG. 3) and periodically collects CDN related statistics from the CDNs 602a-602d at 608. The CDN related statistics for the CDNs 602a-602d may be manually fed into the performance monitoring module 214 by the operator of the system 150, or, the performance monitoring module 214 may periodically poll the CDNs 602a-602d for CDN related statistics. In some embodiments, the CDNs 602a-602d may generate respective statistics and automatically communicate the CDN related statistics to the performance monitoring module 214. In some embodiments, the performance monitoring module 214 may be configured to track HTTP status codes, which are transmitted by the CDNs 602a-602d to the users and/or to the system 150 in response to the HTTP requests for playback content received from the users. The HTTP status codes may be indicative of whether the delivery of the playback content was successful or an error was encountered during servicing of individual user requests. The performance monitoring module 214 may track HTTP status codes sent out by the CDNs 602a-602d and also correlate the HTTP status codes with status information received from electronic devices of the users being serviced by the respective CDNs to generate the CDN related statistics. In an illustrative example, statistics such as CPU utilization, memory utilization, storage IO utilization, network bandwidth utilization, network connections utilization, file descriptors utilization, cache storage utilization and peering bandwidth utilization may be acquired from the private CDNs, and statistics such as network bandwidth utilization, network connections utilization and peering bandwidth utilization may be acquired from the public CDNs.

At 610, the performance monitoring system 214 stores the CDN related statistics received from the CDNs 602a-602d in the database 160. In one embodiment, such statistical information (i.e., the CDN related statistics) may be stored in form a time series representation.

At 612, the performance monitoring module 214 obtains heartbeat information from one or more electronic devices of the users. Some non-limiting examples of parameters configuring the heartbeat information may include comprehensive user experience score, playback success score, start-up time score, smoothness score, video quality score, and the like.

At 614, the performance monitoring module 214 generates QoS statistics from the heartbeat information.

At 616, the performance monitoring module 214 computes performance statistics for each relevant CDN by utilizing the CDN related statistics and the QoS statistics related to each relevant CDN from the statistical information received from the private and public CDNs. In one illustrative example, performance statistics, or more specifically information characterizing a performance of a CDN, may include information related to statistical metrics such as peak latency, average latency, maximum throughput, average throughput, average traffic load, average error rate, average buffer rate, and the like.

At 618, the performance monitoring module 214 compares the performance statistics for each CDN with a predefined threshold. For example, percentile or percentage thresholds may be set for each parameter, such as, for example, the comprehensive experience score must be above 90 percentile or a video quality score must be above 95 percentile over the combined performance statistics for the respective parameter for all the CDNs.

At 620, the weights/priorities associated with the CDNs in the policy cache 320 in the database 160 are updated based on the comparison of the performance statistics for the respective CDN with the predefined threshold.

At 622, the performance monitoring module 214 provides the performance statistics for the relevant CDNs to the traffic controller 212 at a predefined frequency, such as every N minutes.

Figure 7:
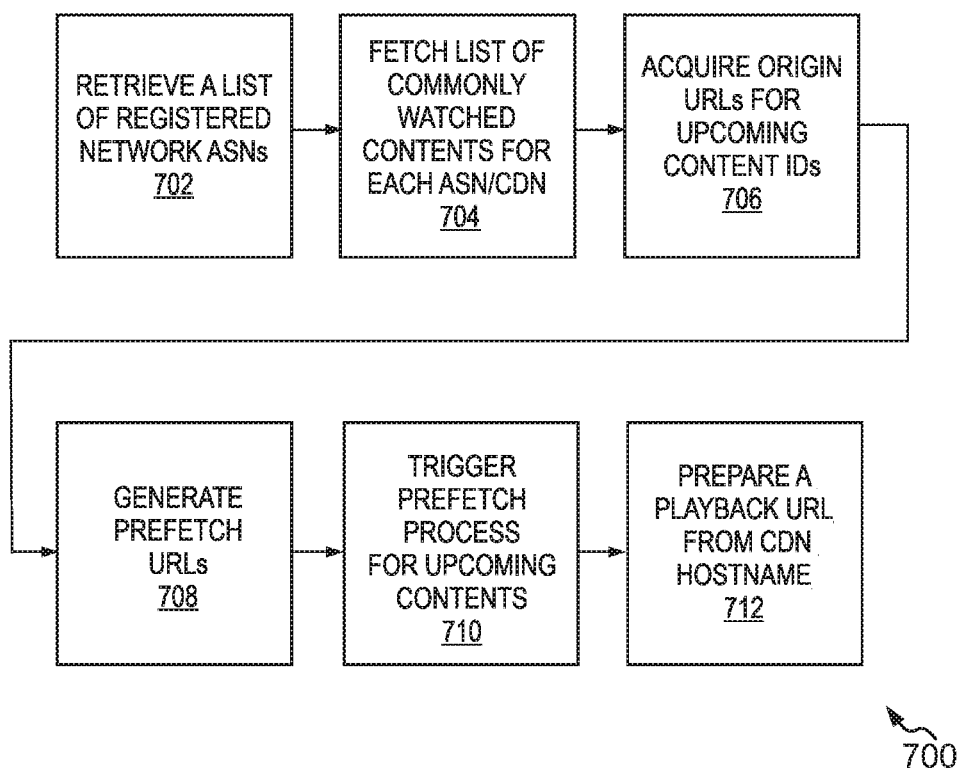
FIG. 7 is a representation showing an example process flow executed by the content prefetch controller for facilitating prefetching of media content by the CDNs, in accordance with an embodiment of the invention.

FIG. 7 is a representation 700 showing an example process flow executed by the content prefetch controller 216 (shown in FIG. 2) for facilitating prefetching of media content by the CDNs, in accordance with an embodiment of the invention. The process flow starts at 702.

At 702, the content prefetch controller 216 retrieves a list of registered network ASNs from the CDN registration data 318 (shown in FIG. 3).

At 704, the content prefetch controller 216 fetches a list of most commonly watched contents, i.e. serials or stand-alone content pieces (for example, movies/sport events etc.) for each of the ASNs in different PoPs associated with the ASN. For each of the entries in the list (i.e. for each ASN/CDN+content combination), the content prefetch controller 216 queries the content provider for the upcoming content IDs to be published.

At 706, the content prefetch controller 216 acquires origin URLs for each of these upcoming content IDs.

At 708, the content prefetch controller 216 generates prefetch URLs for each CDN serving the given ASNs from the origin URLs.

At 710, the content prefetch controller 216 triggers the prefetch process for the upcoming contents with the prefetch URLs. The prefetch process includes calling the prefetch API from each CDN vendor and for each prefetch URL and tracking the status by calling the status API from the CDN vendor.

At 712, the content prefetch controller 216 prepares a playback URL from CDN hostname, which is acquired from the CDN registration data. The playback URL for the corresponding content is dynamically generated at runtime as explained with reference to FIG. 3. The process flow ends at 712.

Figure 8:
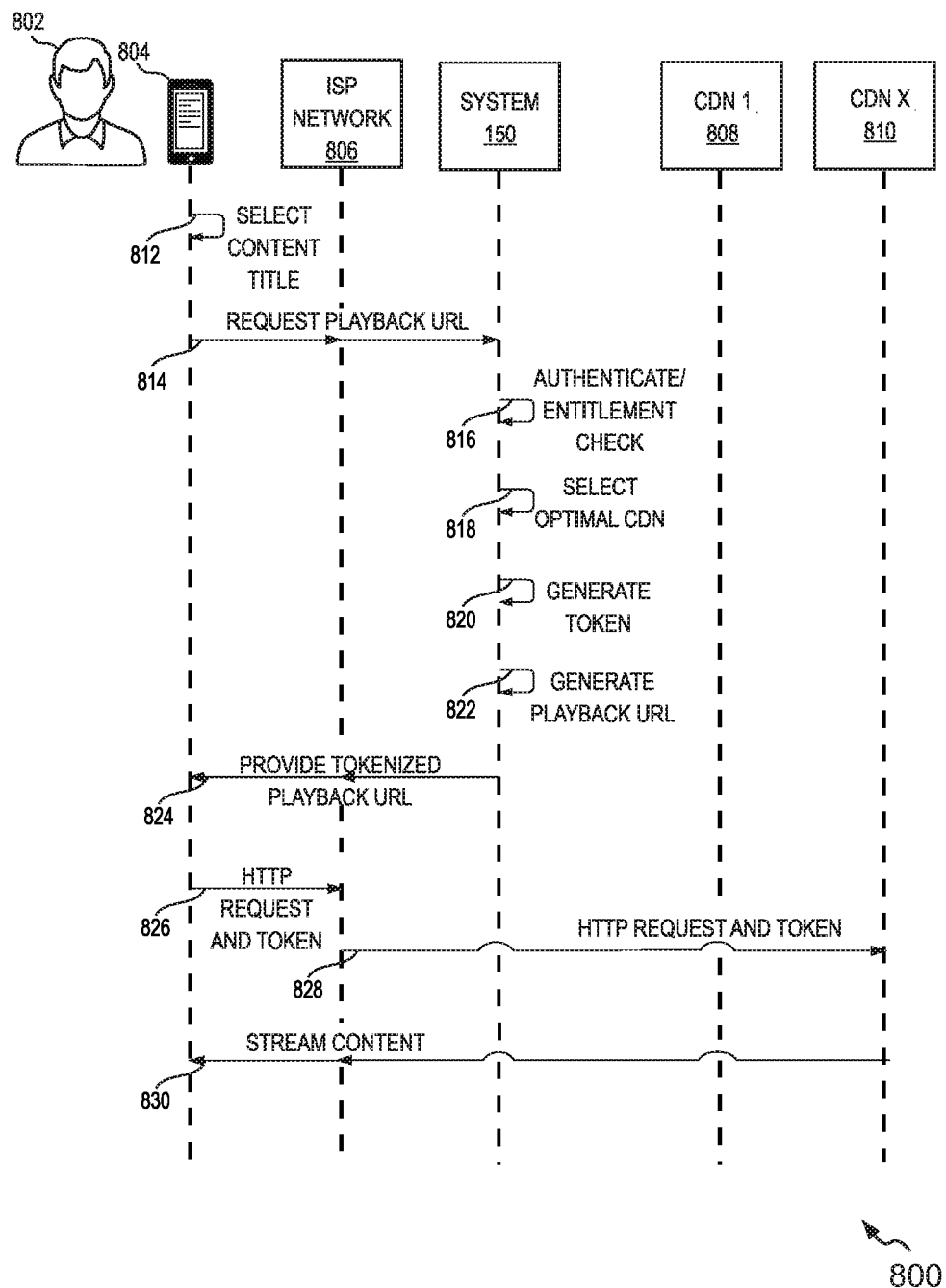
FIG. 8 is a sequence flow diagram for illustrating a process flow for delivering media content to a user, in accordance with an embodiment of the invention.

FIG. 8 is a sequence flow diagram 800 for illustrating a process flow for delivering media content to a user 802, in accordance with an embodiment of the invention. The process flow starts at 812.

At 812, the user 802 selects a content title on an electronic device 804 associated with the user 802. The selection of the content title triggers generation of a request for a playback URL.

At 814, the request for the playback URL generated by the electronic device 804 is received over an ISP network 806 by the system 150, explained with reference to FIGS. 2 to 7.

At 816, authentication and entitlement related checks are performed at the system 150 in response to the user's request for the playback URL.

At 818, an optimal CDN is selected from among a plurality of CDNs for serving the user 802 with the requested content. The selection of the optimal CDN may be performed as explained with reference to FIGS. 2 and 6 and is not explained again herein.

At 820, a token is generated by the system 150 subsequent to the selection of the optimal CDN.

At 822, a playback URL corresponding to the selected CDN is generated at runtime by the system 150.

At 824, the playback URL and the token are provided to the electronic device 804 associated with the user 802.

At 826, the electronic device 804 generates a HTTP request based on the playback URL and transmits the HTTP request and the token to the ISP network 806 associated with the user 802.

At 828, the HTTP request and the token are forwarded by ISP network 806 to a relevant CDN from among a plurality of CDNs. For example, a CDN X 810 may be selected from among CDNs-CDN 1 808 and CDN X 810.

At 830, the CDN X 810 streams requested content related to the content title to the electronic device 804 associated with the user 802. The process flow ends at 830.

Figure 9:
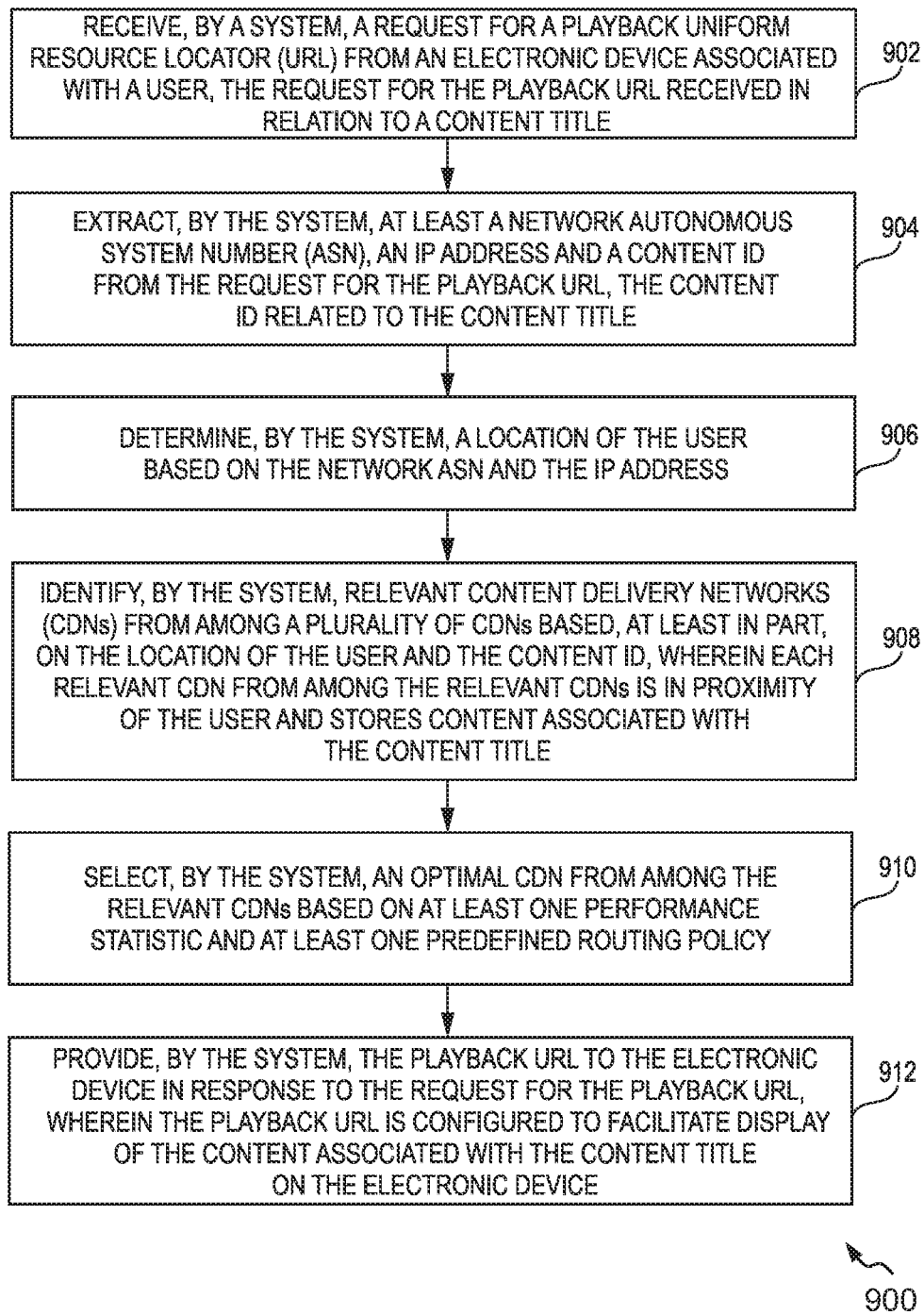
FIG. 9 is a flow diagram of a method for selecting an optimal CDN from among a plurality of CDNs for delivering media content to a user, in accordance with an embodiment of the invention.

FIG. 9 shows a flow diagram of a method 900 for selecting an optimal CDN from among a plurality of CDNs for delivering media content to a user, in accordance with an embodiment of the invention. The various steps and/or operations of the flow diagram, and combinations of steps/operations in the flow diagram, may be implemented by, for example, hardware, firmware, a processor, circuitry and/or by a system such as the system 150 explained with reference to FIG. 1 to 7 and/or by a different device associated with the execution of software that includes one or more computer program instructions. The method 900 starts at operation 902.

At operation 902 of the method 900, a request for a playback URL is received from an electronic device associated with a user by a system, such as the system 150 explained with reference to FIGS. 1 to 8. The request for the playback URL is received in relation to a content title.

At operation 904 of the method 900, at least a network Autonomous System Number (ASN), an IP address and a content ID are extracted from the request for the playback URL by the system. The content ID is related to the content title.

At operation 906 of the method 900, a location of the user is determined by the system based on the network ASN and the IP address. The location of the user may be determined as explained in in FIG. 3 in relation to the location extraction module 308.

At operation 908 of the method 900, relevant Content Delivery Networks (CDNs) are identified by the system from among a plurality of CDNs based, at least in part, on the location of the user and the content ID. Each relevant CDN from among the relevant CDNs is in proximity of the user and stores content associated with the content title. The identification of the relevant CDNs may be performed as explained in FIG. 3 in relation to the routing module 310.

At operation 910 of the method 900, an optimal CDN is selected from among the relevant CDNs based on at least one performance statistic and at least one predefined routing policy. The selection of the optimal CDN may be performed as explained in FIGS. 2 to 6.

At operation 912 of the method 900, the system provides the playback URL to the electronic device in response to the request for the playback URL. The playback URL is configured to facilitate display of the content associated with the content title on the electronic device. The method 900 ends at operation 912.

Various embodiments disclosed herein provide numerous advantages. More specifically, the embodiments disclosed herein suggest techniques for delivering streaming content to end users in a timely manner while retaining a rich quality of viewing experience. The user's request for content is not redirected among multiple CDNs as in the case of conventional mechanisms and the user's request for streaming content is serviced from a nearest CDN PoP within the user's home network/peering network, which includes the requested content and moreover guarantees a desired level of performance, thereby vastly improving the end-user experience. Moreover, the prefetching of content to the nearest CDN PoP based on the ASN/region historic usage patterns enables placing of content close to the requesting users. Furthermore, the selected optimal CDN is not only the most performance effective CDN in terms of latency and viewing quality from an end-user perspective, but also cost-effective and optimal from the content provider perspective.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processing module 202, the memory module 204, the I/O module 206, and the communication module 208 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for delivering media content to users, the method comprising:
receiving, by a system, a request for a playback Uniform Resource Locator (URL) from an electronic device associated with a user, the request for the playback URL received in relation to a content title;
extracting, by the system, at least an IP address and a content ID from the request for the playback URL, the content ID related to the content title;
determining, by the system, a location of the user based on the IP address;
identifying, by the system, relevant Content Delivery Networks (CDNs) from among a plurality of CDNs based, at least in part, on the location of the user and the content ID, wherein each relevant CDN from among the relevant CDNs is associated with an autonomous system number (ASN), is in proximity of the user, and stores content associated with the content title;
comparing, by the system, at least one performance statistic for the relevant CDNs to at least one threshold in at least one predefined routing policy to select qualified CDNs;
selecting, by the system, an optimal CDN from among the qualified CDNs based on respective weights assigned to the qualified CDNs in the at least one predefined routing policy; and
providing, by the system, the playback URL to the electronic device in response to the request for the playback URL, wherein the playback URL is configured to facilitate display of the content associated with the content title on the electronic device.

2. The method as claimed in claim 1, further comprising:
performing, by the system, at least one of an authentication check and an entitlement check on receipt of the request for the playback URL, wherein the authentication check is performed to authenticate account credentials associated with the user and, wherein the entitlement check is performed to check whether the user is entitled to access the content based on the account credentials.

3. The method as claimed in claim 1, wherein the identification of the relevant CDNs from among the plurality of CDNs further comprises performing a check for a presence of at least one attribute in relation to the content associated with the content title.

4. The method as claimed in claim 3, wherein an attribute from among the at least one attribute corresponds to one of a high definition resolution of the content and multilingual versions of the content.

5. The method as claimed in claim 1, wherein determining the location of the user comprises:
extracting, by the system, a network autonomous system number (ASN); and
comparing, by the system, the extracted network ASN and the IP address with information stored in a pre-populated database to determine a network associated with the electronic device and a current geolocation indicating at least one of a country, a region and a city of the user.

6. The method as claimed in claim 1, wherein the at least one performance statistic is generated based on CDN related statistics and QoS statistics related to each relevant CDN from among the relevant CDNs, wherein a CDN related statistic in relation to a relevant CDN corresponds to one of a central processing unit (CPU) utilization, a memory utilization, a storage IO utilization, a network bandwidth utilization, a cache storage utilization and a peering bandwidth utilization.

7. The method as claimed in claim 6, further comprising:
receiving, by the system, heartbeat information from electronic devices of a plurality of users associated with at least one of the location of the user and a relevant CDN from among the relevant CDNs, wherein the plurality of users comprises the user; and
analyzing the heartbeat information, by the system, to generate the QoS statistics related to each relevant CDN.

8. The method as claimed in claim 1, further comprising:
assigning, by the system, weights and priorities to the plurality of CDNs, wherein each relevant CDN is associated with a respective weight and a respective priority and, wherein the assignment of weights to the relevant CDNs is configured to facilitate sharing of traffic if multiple CDNs from among the plurality of CDNs are identified as the relevant CDNs.

9. The method as claimed in claim 8, wherein a predefined routing policy from among the at least one predefined routing policy comprises evaluating the relevant CDNs based on the associated weights.

10. The method as claimed in claim 9, wherein the predefined routing policy further comprises evaluating the relevant CDNs based on associated priorities if multiple relevant CDNs are deemed equivalent subsequent to weight based evaluation of the relevant CDNs.

11. The method as claimed in claim 1, further comprising:
generating the playback URL, by the system, subsequent to the selection of the optimal CDN, wherein an IP address associated with a CDN hostname of the optimal CDN is dynamically determined to facilitate generation of the playback URL at runtime.

12. The method as claimed in claim 1, further comprising:
causing, by the system, a prefetching of the content from at least one content ingestion server into one or more CDNs from among the plurality of CDNs based on at least one of a network ASN and a location of a plurality of users anticipated to request the content.

13. A system for delivering media content to users, the system comprising:
one or more computer processors; and
a computer-readable storage medium comprising instructions for controlling the one or more computer processors to be operable to:
receive a request for a playback Uniform Resource Locator (URL) from an electronic device associated with a user, the request for the playback URL received in relation to a content title;
extract at least, an IP address and a content ID from the request for the playback URL, the content ID related to the content title;
determine a location of the user based on the IP address;
identify relevant Content Delivery Networks (CDNs) from among a plurality of CDNs based, at least in part, on the location of the user and the content ID, wherein each relevant CDN from among the relevant CDNs is associated with an autonomous system number (ASN), is in proximity of the user, and stores content associated with the content title;
compare at least one performance statistic for the relevant CDNs to at least one threshold in at least one predefined routing policy to select qualified CDNs;
select an optimal CDN from among the qualified CDNs based on respective weights assigned to the qualified CDNs in the at least one predefined routing policy; and
provide the playback URL to the electronic device in response to the request for the playback URL, wherein the playback URL is configured to facilitate display of the content associated with the content title on the electronic device.

14. The system as claimed in claim 13, wherein the system is further caused to:
perform at least one of an authentication check and an entitlement check on receipt of the request for the playback URL, wherein the authentication check is performed to authenticate account credentials associated with the user and, wherein the entitlement check is performed to check whether the user is entitled to access the content based on the account credentials.

15. The system as claimed in claim 13, wherein for identification of the relevant CDNs from among the plurality of CDNs, the system is further caused to:
perform a check for a presence of at least one attribute in relation to the content associated with the content title.

16. The system as claimed in claim 15, wherein an attribute from among the at least one attribute corresponds to one of a high definition resolution of the content and multilingual versions of the content.

17. The system as claimed in claim 13, wherein for determining the location of the user, the system is further caused to:
extract a network autonomous system number (ASN); and
compare the extracted network ASN and the IP address with information stored in a pre-populated database to determine a network associated with the electronic device and a current geolocation indicating at least one of a country, a region and a city of the user.

18. The system as claimed in claim 13, wherein the at least one performance statistic is generated based on CDN related statistics and QoS statistics related to each relevant CDN from among the relevant CDNs, wherein a CDN related statistic in relation to a relevant CDN corresponds to one of a central processing unit (CPU) utilization, a memory utilization, a storage IO utilization, a network bandwidth utilization, a cache storage utilization and a peering bandwidth utilization.

19. The system as claimed in claim 18, wherein the system is further caused to:
receive heartbeat information from electronic devices of a plurality of users associated with at least one of the location of the user and a relevant CDN from among the relevant CDNs, wherein the plurality of users comprises the user; and
analyze the heartbeat information to generate the QoS statistics related to each relevant CDN.

20. A computer-implemented method for delivering streaming content to users, the method comprising:
receiving, by a system, a request for a playback Uniform Resource Locator (URL) from an electronic device associated with a user, the request for the playback URL generated by the electronic device in response to a selection of a streaming content title from among a plurality of streaming content titles displayed on the electronic device;

extracting, by the system, at least an IP address and a content ID from the request for the playback URL, the content ID related to the streaming content title;

determining, by the system, a location of the user based on the IP address;

identifying, by the system, relevant Content Delivery Networks (CDNs) from among a plurality of CDNs based, at least in part, on the location of the user and the content ID, wherein each relevant CDN from among the relevant CDNs is associated with an autonomous system number (ASN), is in proximity of the user, and stores content associated with the content title;

generating, by the system, CDN related statistics and QoS statistics for the each relevant CDN from among the identified relevant CDNs;

comparing, by the system, CDN related statistics and QoS statistics for the relevant CDNs to at least one threshold in at least one predefined routing policy to select qualified CDNs;

selecting, by the system, an optimal CDN from among the qualified CDNs based on the CDN related statistics, the QoS statistics and respective weights assigned to the qualified CDNs in the at least one predefined routing policy;

generating the playback URL, by the system, based on an IP address associated with a CDN hostname of the selected optimal CDN; and providing, by the system, the playback URL to the electronic device in response to the request for the playback URL, wherein the electronic device is configured to generate a hypertext transfer protocol (HTTP) request based on the playback URL and fetch the streaming content from the optimal CDN using the HTTP request.

* * * * *